United States Patent [19]
Norheim, Jr.

[11] Patent Number: 4,719,953
[45] Date of Patent: Jan. 19, 1988

[54] ANTI-SLIP DEVICE

[76] Inventor: Raymond H. Norheim, Jr., 14 Monterra Dr., Port Angeles, Wash. 98362

[21] Appl. No.: 858,197

[22] Filed: May 1, 1986

[51] Int. Cl.⁴ ............................................. B60C 27/00
[52] U.S. Cl. ..................... 152/216; 24/300; 24/304; 24/DIG. 11; 152/233
[58] Field of Search ............ 152/169, 208, 213 R, 152/216, 217, 222, 223, 221, 231–233; 81/15.8; 24/116 R, 304, 300, 301, 448, 129 D, 447

[56] References Cited
U.S. PATENT DOCUMENTS

| 2,078,764 | 4/1937 | Kielmansegg | 152/233 X |
| 2,946,367 | 7/1960 | Zeitlin | 152/233 |
| 3,517,719 | 6/1970 | Mueller | 152/233 X |
| 4,508,150 | 4/1985 | Granryd | 152/169 X |

Primary Examiner—Jerome Massie
Assistant Examiner—Thomas Bokan
Attorney, Agent, or Firm—William I. Beach

[57] ABSTRACT

The anti-slip device comprises a plurality of linkages stretched over the tread of a vehicular tire. The ends of the linkage are formed into loops and extend over the tire sidewalls. In the proximity of the loops are a plurality of binder covered frames attached to the sidewalls in equal segments of space. Protruding from the binder is an extension adapted to be connected with and penetrate the end loops of the linkages to fasten the linkages on the tire tread.

13 Claims, 6 Drawing Figures

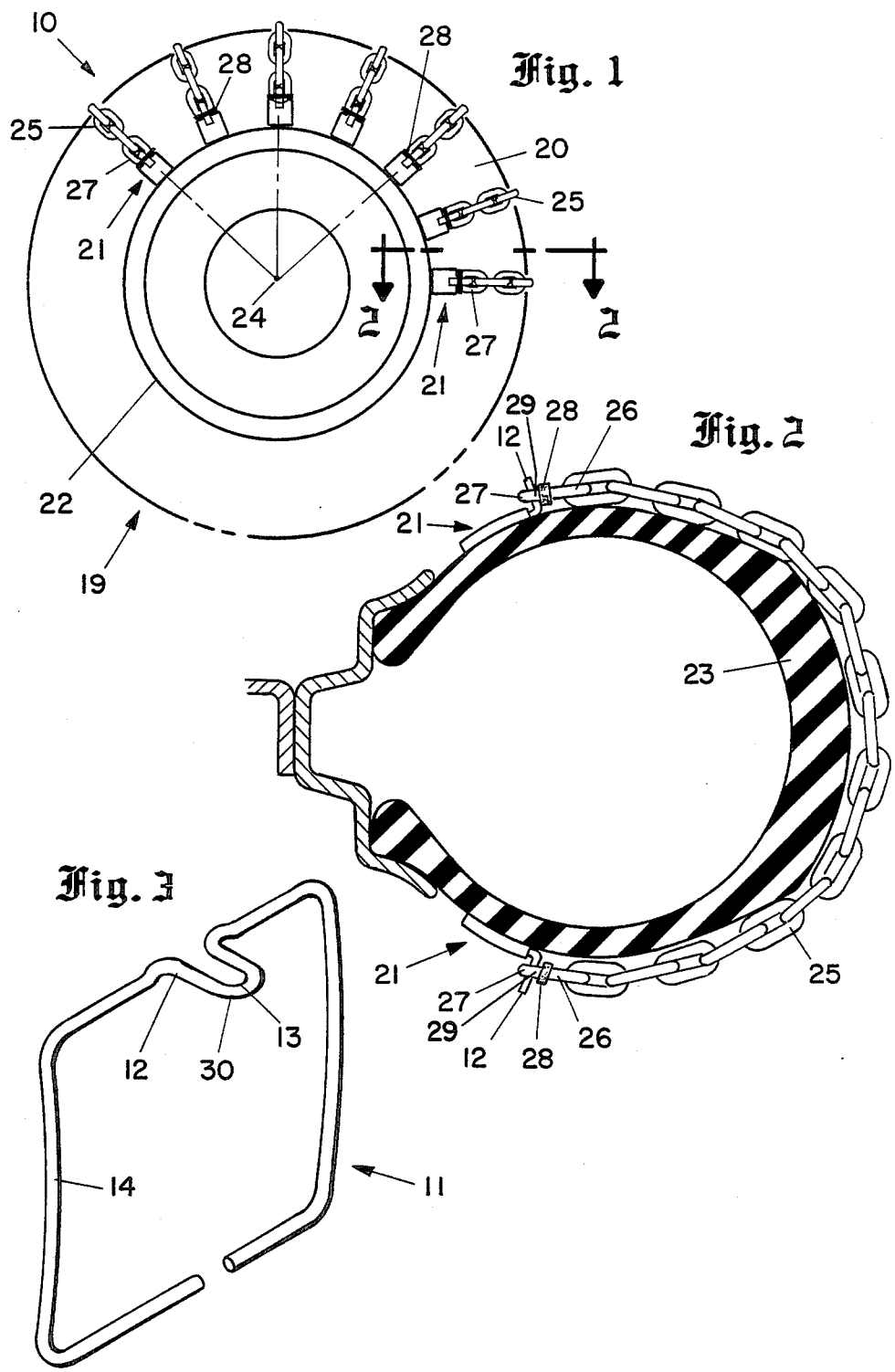

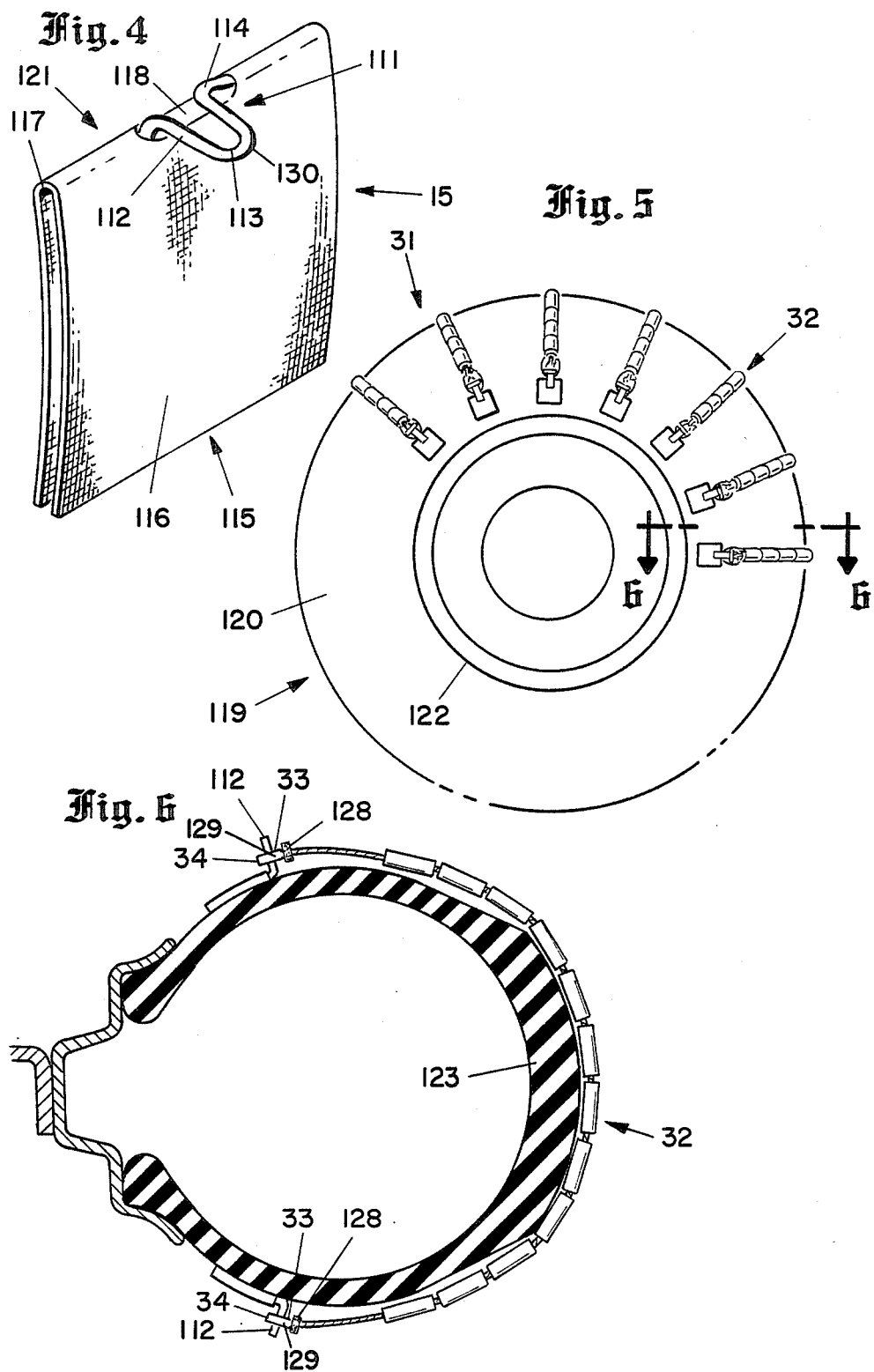

ANTI-SLIP DEVICE

BACKGROUND OF THE INVENTION

1. Field of the Invention

The present invention relates to tire chains and similar devices and more particularly to vehicular skid prevention devices that are inexpensive and eliminates much of the labor and difficulties of installing conventional tire chains.

2. Description of the Prior Art

A novelty search of tire chain devices indicate that most are complicated in design and present installation problems. For the most part such devices provide too many problems. Some are too expensive to produce for the market. Others of somewhat elaborate design require considerable amount of time and effort to install for use.

For example, "Tire and Chain Combination" disclosed in U.S. Pat. No. 3,517,719, issued to G. R. Mueller presents an assortment of odd shaped elements applied to built in attachments which are included in the manufacture of the tire. It is to be pointed out that the tread chains 20 are connected to an attachment plate 21 which is connected to a lip 13. The lip is integrally formed on the side walls of the tire by flexible hooking means. Aside from the fact that tire manufacturers would most likely refuse to change production procedures and tooling to produce Mueller's design the added costs would be unacceptable to the public.

Another example is U.S. Pat. No. 2,146,453 issued to F. E. Stahl. Stahl ues an attachment plate similar to Mueller's device except that it is connected to the rim instead of having a lip molded in the tire side wall. A clip 12 is placed between the tire and the wheel rim. Connected to the clip are left and right hand rings 10 and 11. Connected to the rings are fastening plates 23 and 24. Plate 24 is part of a clamping element 25. A hook 22 is then attached to the plates and a chain 21 on the tread of the tire.

Several other devices similar to Stahl's traction device include U.S. Pat. No. 2,598,594, issued to A. H. Perlman and U.S. Pat. No. 2,020,586, issued to L. W. Stetson. Both provide chains attached to the tire rim.

In view of the above reference prior art it is the object of the present invention to provide a skid prevention device that will solve the aforementioned problems. The present invention comprises simple connecting members and means for securing an efficient and effective skid prevention device on automotive tires. The members can be manufactured inexpensively and are readily adapted to most conditions under severe ice and snow in minimum time and effort.

SUMMARY OF THE INVENTION

In carrying out the principles of the present invention in accordance with a preferrred embodiment thereof a plurality of linkages are mounted on an automotive tire. The linkage has opposite ends formed into loops. Secured on the loops is a flexible element laterally disposed adjacent to the end. Another member of the skid prevention device is a relatively small arcuate frame which has an extension protruding from a side portion and ending in a loop. The extension is further formed inwardly at its connection to the frame rim to subtend an acute angle with respect to the rim. Included also is a binder for covering the frame that provides an opening in the fold through which the extension is exposed for a pivotal connection with the looped ends of the linkages. Means is provided for fastening the binder covered frame on the tire sidewalls. An adhesive is used to attach the binder in spaced position for a conjoint unison with the linkages. Final means connect the linkages with the binder covered frame and complete the fastening of the linkages end loops and the extension in a united lock.

BRIEF DESCRIPTION OF THE DRAWING

FIG. 1 is an elevated side view of a tire assembled with an embodiment of the present invention, FIG. 2 is an elevated sectional view of FIG. 1 taken along line 2—2 showing a length of chain secured on a tire tread connected to a binder covered frame attached to the sidewalls, FIG. 3 is an enlarged prospective view of the frame, FIG. 4 is an enlarged prospective view of the binder covered frame and projecting extension, FIG. 5 is an elevated side view of a modified embodiment of the present invention, and FIG. 6 is an elevated sectional view of FIG. 5 taken along line 6—6 of FIG. 5 showing a length of cable secured on a tire tread.

DETAILED DESCRIPTION OF THE PRESENT INVENTION

Referring to FIG. 1–4 it can be seen that the skid prevention device 10 consists of a plurality of linkage stretched across the tread of a tire. The ends of the chain extend over the tread and along the sidewalls. On the sidewalls are located a plurality of binders spaced in equal segments around the sidewalls surface. Enclosed in the binders are frame elements including an outwardly projecting extension. The downwardly extending ends of the chains are connected to the extension exposed out of the plurality of binders to fasten the linkages on the tire.

The device 10 includes a preliminary preparation of the tire and connecting elements before the linkages are mounted on the tire. One of the connecting elements is a small substantially square frame 11 formed from a relatively heavy gauge wire, preferably 14 gauge. The frame 11 can be readily formed by multiple action tools or molds. Essentially, a wire length is bent in half to form a finger-like extension 12 terminating in an end loop 13 and subsequently bent in three pairs of 90° corners to form the frame rim 14. Finally, the frame is formed with a slight curvature on the side opposite of the extension so as to conform more closely to the curvature of the sidewall of the tire. While a wire frame 11 is described here it is to be pointed out that such a frame could be stamped out of flat metal, cast or forged, which would serve as well.

Covering the frame is a binder 15 comprising a piece of flexible sheet material folded in half to enclose frame 11. In the fold portion is a small opening 18 through which the extension 12 of the frame can extend outside of the binder when enclosed. For the binder it has been found that a vinyl impregnated material is sufficiently stiff and tear resistant to support frame 11 when attached to a tire 19. The advantage of enclosing the frame in a binder is the ease and simplicity which it can be securely attached to a tire sidewall 20. This along with the linkages and binder covered frame 21 provides a very effective and inexpensive means for the public to equip automotive drive wheels with an efficient traction device. More importantly, the fact that such linkages can be quickly applied to the drive wheel greatly eliminates the discomfort and laborous effort of putting conventional tire chains and the like on tires in bitter cold conditions. Be that as it may, in attaching the binder covered frame to the tire a suitable adhesive is applied to the binder 15. Most low pressure contact resin will suffice, but preferably a commercially available "weldwood" adhesive is used. For this purpose the binder 15 is spread open and the frame 11 is placed on a half portion with the extension 12 projecting through the opening 18. A thin coating of adhesive is spread on the inside and over the frame. The binder is then folded and coated with the adhesive on the outside side opposite of the projecting extension 12. The coated binder is then bonded in equal segments on the sidewall 20 adjacent to the rim portion 22 of the tire 19. The binder is attached on the sidewall with the opening 18 facing the tire tread 24 and the extension 12 loop end 13 is extending at a slight angle in the direction of the tire center. The approximate peripheral spacing of chain or cable linkages on conventional traction devices is 6 inches. Accordingly, when the linkage spaces are marked around the tire tread 23 and radial lines on the sidewalls 20 to the center of the tire are likewise marked on the sidewall the location for positioning the binder covered frame 11 is established. It is possible but not necessary to remove or have the drive wheels removed before marking the tire 19 and applying the binder 15 on the radial line 24 see FIG. 1. When the adhesive on the binder covered frame 21 hardens the binder is securely attached to the sidewall of the tire. However, in the event the tire is scraped along a parkway curb and bends the extension 12 of frame 11 out of alignment with the linkages the damaged binder covered frame 21 can be removed with a solvent and replaced.

The linkages as defined above may be a chain or cable. Both are used in conventional sets of traction devices for different sizes and types of tires.

In the case of chains as suggested herein, the skid prevention device 10 includes a plurality of chain lengths 25. Chain 25 has a pair of spaced ends 26 formed into loops 27 and is mounted on tread 23 of tire 19 with separate end loops extending over sidewalls 20 in the proximity of the binder covered frame 21. Attached to and stretched across loop ends 27 is a rubber-like band 28 which provide an opening 29 adjacent to ends 26. Also included is a rubber-like coating 30 spread on the loop portion of ends 26. The combined effect of band 28 and coating 30 provides a flexible entrance to opening 29.

A modified arrangement is shown in FIG. 6 which is essentially the same device as illustrated in FIGS. 1-4 except for the linkage connection to the binder enclosed frame as previously described herein. In FIG. 6 the elements that are functionally equivalent in connection with FIGS. 1-5 are designated by similar reference numerals each with the prefix 1 added thereto.

Thus, FIG. 6 shows a modified skid prevention device 131. Included is a small square-like frame 111 formed of 14 gauge wire. The frame has an extension 112 of the wire extending to a closed end loop 113 outwardly from a side rim 114 of frame 111. The fingerlike extension 112 is formed outwardly and inwardly toward the frame interior to subtend an acute angle with rim 114. Further, like frame 14, frame 114 is formed with a slight curvature on the frame opposite side of the extension.

Enclosing frame 111 is a binder 115 consisting of durable, flexible sheet material 116 folded in half 117 to enclose frame 111. Included also in binder 115 is a small opening 118 located in the fold 117 through which a passage is provided to expose extension 112 when the binder is folded. The important reason for enclosing the frame in a binder is that it provides simple and inexpensive means for attaching frame 111 to a tire 119 sidewall 120. An adhesive is subsequently applied on the inside and on the outside portion of the binder enclosed frame 121 opposite of the exposed extension 112. Then the binder enclosed frame 121 is attached to the sidewall 120 of tire 119 adjacent to the rim portion 122.

The third element of skid prevention device 31 is a cable length 32 which has spaced ends 33. Ends 33 are folded into loops 34 and ends 33 are lashed to the side of cable length 32. Adjacent to the ends 33 is rubber-like band 128 secured across loop 34 and together with end 33 form a snug flexible opening. The end 33 outwardly of band 128 is coated with a rubber-like compound which tends to act with band 128 to resist penetration or withdrawal after penetration from opening 29.

Like chain length 25, cable length 32 is stretched across tread 123 of tire 119 with respective ends extending along sidewalls 120 in the proximity of binder enclosed frame 121. Then to fasten chain 25 or cable 32 to the binder enclosed frame the loop ends are brought in contact with the binder enclosed frame extension and pressed inwardly toward the sidewalls until penetration is achieved through the loops.

From the aforegoing description and illustration of the present invention it is obviously an improvement and provides important advantages over conventional tire chains and the like.

The above description is to be clearly understood to be given by illustration and example only, the spirit and scope of the present invention being limited solely by the appended claims.

I claim:

1. A vehicular skid prevention device, which comprises in combination:

a plurality of linkages for mounting on automotive tires including opposite end loops having flexible elements secured on the loops adjacent to an outer end, relatively small arcuate frames each comprising an extension from a side portion terminating in a folded, closed end loop, the extension further being formed inwardly at its connection to the frame rim so as to subtend an acute angle with the rim, binders for covering said frames each binder having an opening in a fold for passage of said extension therethrough for a pivotal connection with one of said opposite end loops of the linkages, means for fastening the binder covered frames on the tire sidewalls with an adhesive in spaced position for a conjoint union with said linkages, and means for connecting said linkages with the fastened binder covered frames and to join said linkages end loops and said extension in a united lock.

2. A vehicular skid prevention device as recited claim 1, wherein:

said linkage consists of a length of chain.

3. A vehicular skid prevention device as recited in claim 2, wherein:

the end loops of the chain have a rubber band secured adjacent to the outer end so as to provide a pressure resisting opening.

4. A vehicular skid prevention device as recited in claim 1, wherein:
said frame is a length of wire formed in an arcuate, square rim and includes a finger extension being shaped prior to forming the square rim.

5. A vehicular skid prevention device as recited in claim 1, wherein:
said binder is substantially a folded section of flexible tear-resistant sheeting receptive to bonding technique.

6. A vehicular skid prevention device as recited in claim 1, wherein:
the means for fastening the binder covered frame on the tire sidewalls comprises an adhesive coating on the inside of said binder and an outside side opposite of said frame extension and the binder covered frames are pressed against said sidewalls in equal spaces around said tire.

7. A vehicular skid prevention device as recited in claim 1, wherein:
the means for connecting said linkages with said fastened binder covered frame consists of a rubber coating and each of said linkages are stretched over said tire tread, one at a time, such that said end loops extend in close proximity of said extension and press together until penetrated by said extension.

8. A vehicular skid prevention device, which comprises in combination:
a plurality of linkages for installing on automobile tire treads including spaced end loops bound with a rubber band across the loops adjacent to the outer ends,
small substantially square arcuate frames each comprising a finger extension extending outwardly of a side rim to a closed end loop, the extension being formed at its juncture to the rim and bent inwardly to the interior of the frame so as to subtend an acute angle with respect to said rim,
binders for enclosing said frames each binder containing an opening in the fold for exit of said extension therethrough, said extension being exposed for a pivotal connecton with one of said end loops of the linkages,
means for attaching the binder enclosed frames on the tire sidewalls with an adhesive bonding agent and to position said binders around said sidewalls in equal segments for a conjoint union with said linkages, and
means for connecting said linkages with the attached binder enclosed frames so as to align said linkages with said binders and press said linkages end loops onto said extension in a tight lock.

9. A vehicular skid prevention device as recited in claim 8, wherein:
said linkages are lengths of cable having spaced ends formed into loops adapted, together with the rubber band, to provide a seizing closure on said extension.

10. A vehicular skid prevention device as recited in claim 8, wherein:
said frame is a length of wire formed in half to produce said extension, the ends are further stretched apart for a first 90° bend and a final 90° bend for a square rim with said ends brought together for the closing side.

11. A vehicular skid prevention device as recited in claim 8, wherein:
said binder is a durable tear-resistant material receptive to adhesive bonding technique and adapted enclose said frame securely on the surface of said tire sidewalls.

12. A vehicular skid prevention device as recited in claim 8, wherein:
the means for attaching the binder enclosed frames on the tire sidewalls consists of a coating of low pressure contact resin applied on the inside surface of the binder, over said frame and on the binder outside portion opposite of said extension, the binder is applied on said sidewalls with said extension stretching inwardly toward said tire center in equal increments predetermined by the spacing of said linkages on said tire.

13. A vehicular skid prevention device, as recited in claim 8, wherein:
the means for connecting said linkages with the binder enclosed frames so that said linkages are stretched, one at a time, over said tire tread in alignment with said binder such that said end loops are in the proximity of said extension and locked together when pressed inwardly and upwardly in a united lock consists of a rubber coating.

* * * * *